(No Model.)
C. W. LEVALLEY.
CORD HOLDER FOR GRAIN BINDERS.
No. 260,485. Patented July 4, 1882.
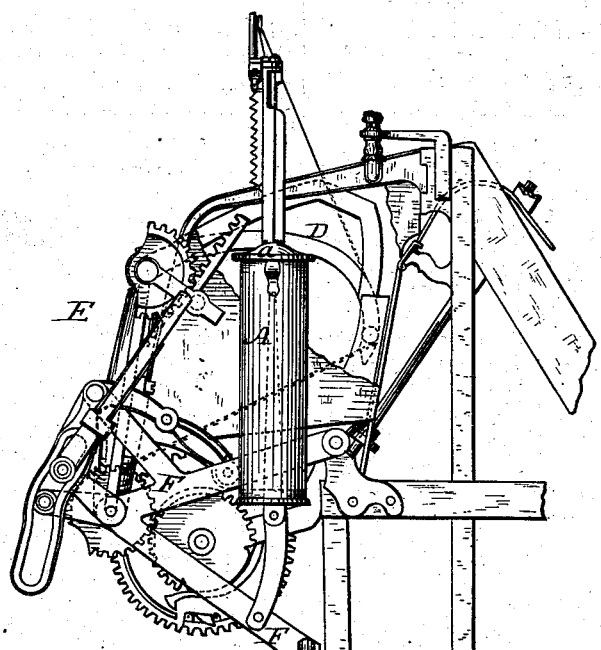
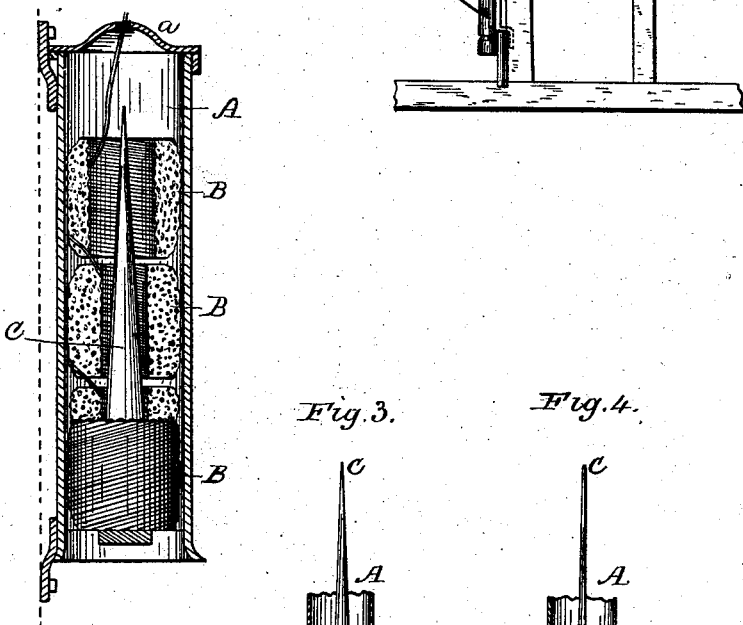
Witnesses:
W. B. Masson
J. S. Barker
Inventor:
Christopher W. Levalley
by Doubleday & Bliss attys

UNITED STATES PATENT OFFICE.

CHRISTOPHER W. LEVALLEY, OF ST. PAUL, MINNESOTA, ASSIGNOR OF ONE-HALF TO SYLVANUS D. LOCKE, OF HOOSICK FALLS, NEW YORK.

CORD-HOLDER FOR GRAIN-BINDERS.

SPECIFICATION forming part of Letters Patent No. 260,485, dated July 4, 1882.

Application filed April 23, 1881. (No model.)

*To all whom it may concern:*

Be it known that I, CHRISTOPHER W. LEVALLEY, a citizen of the United States of America, residing at St. Paul, in the county of Ramsey and State of Minnesota, have invented certain new and useful Improvements in Cord-Holders for Grain-Binders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is an elevation of a binder having my improved cord-holder attached. Fig. 2 is a central vertical section, enlarged, of the cord-holder detached. Figs. 3 and 4 show modified constructions for supporting the spindle within the casing.

Hitherto in the operation of grain-binders much difficulty has been experienced from the fact that the cord must be wound upon spools or reels, which necessitates either the additional cost of the spools or a great amount of labor on the part of the operator to wind the cord on the spools. Moreover, when the ordinary spools are used the twine is liable to be damaged by rain or other moisture, the effect of which is to soften the cord and render it unfit for use.

The twine-holder A, which I have devised and shown, is preferably cylindrical in form, and it may be of any desired length, it being possible and practicable to make it of this form large enough to carry cord sufficient for a day's work. The bottom of the vessel is by preference substantially open, there being one or more strips or cross-pieces to support the twine. It is made thus open at the bottom in order that any dirt which may enter can freely drop out, as straws or other foreign and undesired material.

The top of the holder is provided with a hinged cap or cover, *a*, through an aperture in which the cord passes out to the needle. In this receptacle several balls, B, (two or more,) of cord are placed at once, the end at the outside of each ball being tied to the end on the inside of the ball next below. This enables the operator to employ twine as it is commercially prepared and sold in ordinary balls.

Under some circumstances, and with some kinds of twine, I have found it desirable to use a central rod placed within the balls, in order to facilitate the "rendering" of the twine and prevent it from tangling or kinking.

C is a rod or shaft passing through the balls, and may be used for holding them together. It may, if desired, be cylindrical and secured to the bottom cross-piece of the holder A by a ball and socket, Fig. 3, or other universal joint; or it may be made of some flexible material, Fig. 4, so that the shaft shall not be rigid, but have a flexible play at the top. When this rod is employed the cord unwinds evenly and smoothly from the ball without any tendency to form knots or kinks or wads, as will be readily understood without further explanation. I have also shown and used for this purpose a loose tapering shaft with its larger and heavier end at the bottom. (See Fig. 1.)

D is the needle supported upon the needle-frame E, which is pivoted to the main frame, one bracket, F, of which is shown, the general construction of the binder being shown in my Patent No. 226,865, April 27, 1880, of which this is a division, and to which reference is made for a more specific description thereof, as the invention for which protection is sought in this case is confined to the cord-holder. I prefer in this case to limit myself to the inventions specifically claimed herein, reserving the right to claim all other patentable subject-matter which may be shown or described in other divisions of my above-mentioned patent, which have been filed or may hereafter be filed.

What I claim is—

1. The method of supplying band-cord to the binding mechanism of grain-binders as herein described, consisting in arranging a series of wound balls of cord within an inclosing case which holds them from disarrangement, and connecting the outer end of the cord of one ball to the inner end of the cord of the adjacent ball and unwinding them successively by the operation of the machine.

2. In a grain-binder, the cord box or holder having a diameter substantially equal to that of the cord balls and a length substantially equal to or exceeding twice the length of one of the cord balls, and having an aperture through its feed end for the purpose of receiving and holding two or more balls and permitting the cord to feed from them through said apertures, substantially as described.

3. The method of supplying band-cord to the binding mechanism of grain-binders as herein described, consisting in arranging a series of wound balls of cord within an inclosing-case which holds them from disarrangement and end to end, connecting the outer end of the cord of one ball to the inner end of the adjacent ball, and unwinding them successively by the operation of the machine, substantially as set forth.

In testimony whereof I affix my signature in presence of two witnesses.

CHRISTOPHER W. LEVALLEY.

Witnesses:
J. H. RANDALL,
JOHN J. McCLOUD.